Jan. 27, 1942.  E. L. WILLIAMS  2,270,914

DISPENSER

Filed July 10, 1939

Inventor
EUGENE LOUIS WILLIAMS

Patented Jan. 27, 1942

2,270,914

UNITED STATES PATENT OFFICE 2,270,914

DISPENSER

Eugene Louis Williams, Niles, Ill., assignor, by direct and mesne assignments, to International Cellucotton Products Company, Chicago, Ill., a corporation of Delaware Application July 10, 1939, Serial No. 283,627

12 Claims. (Cl. 312—50)

This invention relates to dispensers or readily accessible containers for what are known as "facial tissues," that is, sheets of soft absorbent paper used for wiping the face and sometimes used as handkerchiefs. This kind of paper is generally marketed in boxes, in which it is packed in such a way that, as each sheet is removed, it pulls out the end of the next sheet so that it may be easily grasped.

One of the principal objects of the present invention is to provide a convenient means for keeping a box of paper of the type described in an automobile in such a manner that it will be readily accessible and still be out of the way.

Another object of the present invention is to provide a means for storing a box of paper of the type described in an automobile without filling any of the storage space already available.

Another object of the present invention is to provide a dispenser of the character described which shall be simple and inexpensive to construct.

A still further object of the present invention is to provide a dispenser of the character described which can be quickly and easily attached in a convenient location in an automobile, such as under the storage compartment generally provided in the instrument panel, or which can easily be secured in a convenient location in a kitchen, such as by being fixed to the underside of a cupboard.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1:
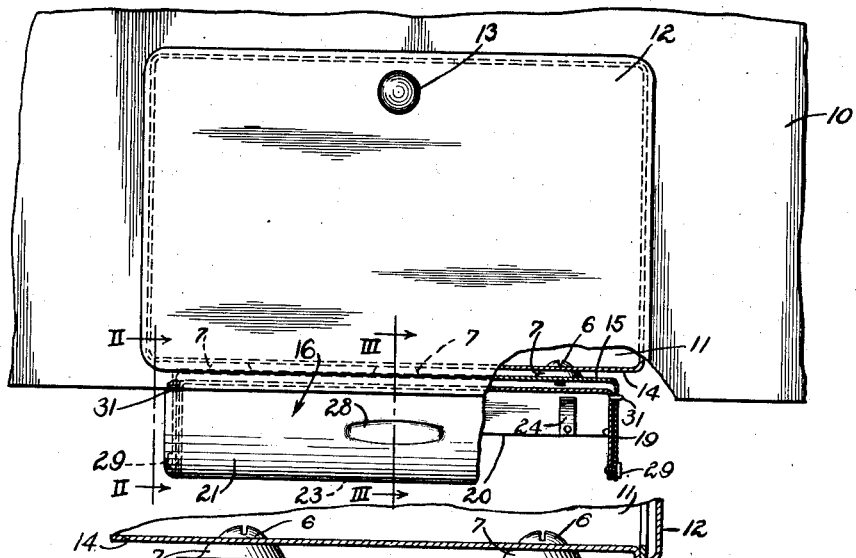
Figure 1 is an elevation of a portion of an automobile instrument panel and one of the preferred forms of the invention secured in place, a portion of the panel and the device being broken away to more clearly illustrate its construction.

While the invention may be used in many locations, such as in a kitchen or in other portions of a house or in various types of vehicles and buildings, its greatest field of utility seems, at present, to be in connection with automobiles, and I have therefore illustrated, as one of the preferred forms of the invention, a form which is particularly adapted for use in automobiles.

Automobiles being manufactured at the present time are generally provided with an instrument panel 10 extending across the front of the passenger compartment. The instrument panel 10 is ordinarily provided with one, or sometimes two, storage compartments known as "glove compartments" 11, access to which is obtained by means of a door 12 opened by a knob 13. The floor 14 of the glove compartment 11 forms a horizontally extending member located in back of and slightly above the lower edge of the instrument panel 10 and is utilized as a support for the dispenser.

The dispenser comprises a wide shallow inverted U-shaped sheet metal bracket 15 whose horizontal top portion is secured to the underside of the floor 14 of the glove compartment. Any type of suitable securing means may be used, the particular ones shown in the drawing comprising three bolts 6 extending through the glove compartment floor 14 and through the tops of bosses 7 formed in the top of the bracket 15. Three bolts 6 and bosses 7 are provided, one near each end of the bracket 15 and near the front, and another in the center near the back, so as to provide a rigid three point support for the bracket 15 irrespective of any small irregularities which may be present on the under surface of the glove compartment floor 14.

The holder 16 for the box 17 of paper is shaped like a rectangular box and is pivoted between the two depending end portions of the bracket 15. The holder 16 is formed of a single piece of sheet metal and comprises a flat rectangular top 18 from the four edges of which are bent down the two ends 19, the back 20, and the front 21 of the holder. Instead of having a bottom, the holder 16 is provided with a narrow lip 23 extending across the bottom of the back of the holder front 21. Thus, the major portion of the bottom of the holder 16 is open, which allows the box 17 of paper to be inserted into the holder from underneath, one side of the box being placed up inside of the holder on top of the flange 23 and then the other side of the box 17 being pushed up into place in front of the holder back 20. In order to prevent the box 17 of paper from falling out of the holder 16, the holder is made so that the front edge of the box is a tight fit between the top 18 of the holder and the flange 23 at the bottom, and a pair of springs 24 are provided to press the box forward and to frictionally hold it up.

The springs 24 are leaf springs riveted at their lower ends to the lower edge of the holder back 20 and curving up and forward inside of the holder. Thus, when a box 17 is inserted into the holder 16, the rear edge of the box will press the springs 24 back and stress them so that they will hold the box forward. If desired, the upper or free ends 25 of the springs may be sharpened or formed into teeth which will bite into the back of the cardboard box 17 and prevent it from accidentally slipping down.

The top 18 of the holder 16 is provided with a central slot 26 extending from one end of the holder to the other and placed so as to register with the slot provided in the top of a standard box 17 of "facial tissues." This permits the "facial tissues" or paper 27 to be removed from the box 17 sheet by sheet in the conventional manner, thus preserving the convenience of the original package 17.

The front 21 of the holder 16 extends out slightly at each end far enough to conceal the front edges of the side 19 of the holder and the depending end portions of the bracket 15 and is slightly round in shape to enhance its appearance. It is also indented in the center to form a fingerhold or handle 28 to facilitate its being swung from one position to the other.

Figure 2:
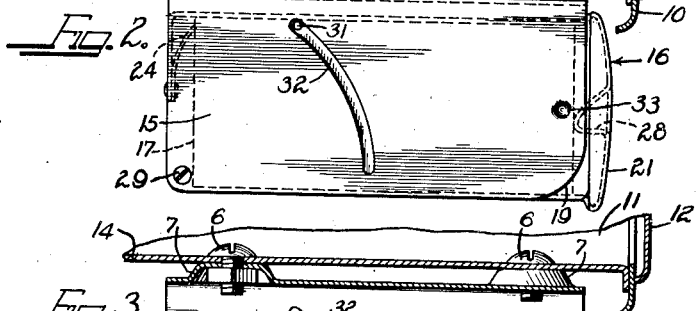
Figure 2 is a section on the line II—II of Figure 1 looking in the direction of the arrows.

The holder 16 is guided in its movement from one position to another by means of pivots 29 which connect the rear lower corners of the end 19 of the holder to the rear lower corners of the depending sides of the bracket 15. This location of the pivots 29 allows the holder 16 to be swung up into the bracket 15, as shown in Figure 2, or else to drop down in front, as shown in Figure 3, so that the top 18 of the holder will be accessible and sheets of paper 27 may readily be removed from the box 17 through the slot 26 in the top of the holder.

Figure 3:
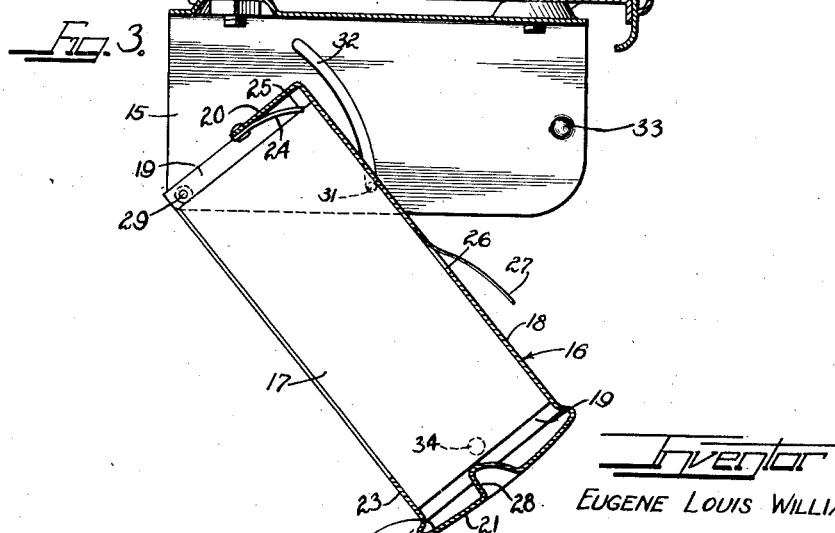
Figure 3 is a section on the line III—III of Figure 1, looking in the direction of the arrows but with the device in open dispensing position.

The holder 16 is prevented from dropping down past the position shown in Figure 3 by stop pins 31 fixed to the end 19 of the holder and working in arcuate slots 32 in the ends of the bracket 15, these slots 32 being concentric with the pivots 29 and being of such a length as to permit the holder 16 to have the desired range of movement. The holder 16 is resiliently held in its upper or closed position by a pair of inwardly projecting bosses 33 near the front edges of the depending ends of the bracket 15, the ends 19 of the holder 16 being provided with recesses or indentations 34 for receiving the bosses 33 when the holder 16 is swung up to its upper position shown in Figure 2. The bracket 15 is resilient enough to permit the bosses 33 to spring out of their recesses 34 in the ends of the holder and permit the holder to be swung down readily while at the same time being strong enough to securely retain the holder 16 in its upper position when desired.

The resiliency of the bracket 15 also permits its two depending sides to be sprung apart when the holder 16 is in the position shown in Figure 3 so as to disengage the stop pins 31 from their slots 32. The holder 16 can then be swung all the way down and back, which makes it easy to put the nuts in place on the bolts 6 when the device is being installed.

Attention is particularly directed to the economical manner in which the device is constructed. Each of the two principal parts, the bracket 15 and the holder 16, is constructed of a single piece of metal without any soldering, riveting, welding, deep drawing or other expensive operations and can be produced with relatively simple dies. The bracket 15 is an approximately rectangular piece of sheet metal having a few holes punched in it and a few bosses stamped up, and having its ends bent down at rightangles to the main portion. The holder 16 formed from an approximately rectangular piece of sheet metal notched out at the corners to form a cross with very short arms, and the arms of the cross are bent down to form the front 21, back 20 and end 19 of the holder, the arm forming the front 21 having its end portion bent in to form the lip 23 at the front of the bottom of the holder and being stamped to give the front 21 its ornamental shape and to provide the fingerhold 28.

From the above description and the accompanying drawing, it will be seen that I have provided a device which is rugged and sturdy in its construction and which is extremely simple and economical to make. It will also be seen that the device is easily attached in an automobile and presents an attractive and unobtrusive appearance, being partially hidden by the lower edge of the instrument panel 10. It will also be seen that I have provided a device which is extremely convenient and easy to use and which utilizes what would otherwise be waste space in the vehicle.

While I have described only one of the preferred forms of the invention, it will of course be understood that the device may be varied in many of its details of construction and may be used in different places than illustrated, as has already been pointed out. Many modifications of this structure may be made, and I, therefore, contemplate by the appended claims to cover all such modifications as fall within the true spirit and scope of my invention.

I claim as my invention:

1. In combination, a substantially flat horizontal supporting member, a rectangular boxlike container below said member, said container having a closed front and an opening in the top through which sheets of paper can be withdrawn, means for holding a box of said sheets in said container, and means for pivotally supporting said container from said supporting member for rotation about a horizontal axis near the back of said container.

2. In combintion, a substantially flat horizontal supporting member, a rectangular boxlike container below said member, means for pivotally supporting said container from said supporting member for rotation about a horizontal axis near the back of said container, means for releasably holding said container close to and substantially parallel to said supporting member, and cooperating stop means on said supporting member and said container for holding said container at an angle to the horizontal when released from said holding means.

3. In combination, a substantially flat horizontal supporting member, a rectangular boxlike container below said member, means for pivotally supporting said container from said supporting member for rotation about a horizontal axis near the back of said container, means for releasably holding said container close to and substantially parallel to said supporting member, and cooperating stop means on said supporting member and said container for holding said container at a substantial oblique angle to the horizontal when released from said holding means, said pivotal supporting means comprising a pair of resilient plate portions depending from the supporting member at each end of said container and pivotally carrying the container, and said stop means comprising cooperating pins and arcuate slots releasable by springing out said resilient plate members.

4. A holder for a box of paper to be dispensed, said holder comprising means fixed relative to each other for engaging the top and ends and front and the forward part of the bottom of said box, the major portion of the bottom of said holder being open to permit the insertion of said box up into said holder, and resiliently movable means on said holder for engaging and supporting said box near the back thereof and for preventing backward movement of said box.

5. A holder for a box of paper to be dispensed, said holder comprising means fixed relative to each other for engaging the top and ends and front and the forward part of the bottom of said box, the major portion of the bottom of said holder being open to permit the insertion of said box up into said holder, and upwardly and inwardly projecting teeth on said holder for engaging and supporting said box near the back thereof and for preventing backward movement of said box.

6. A holder for a box of paper to be dispensed, said holder comprising means fixed relative to each other for engaging the top and ends and front and the forward part of the bottom of said box, a large portion of the back of said holder being open to permit insertion of said box forward into said holder and into engagement with said engaging means, and upwardly and inwardly projecting teeth on said holder for engaging and supporting the rear portion of said box and for preventing backward movement thereof.

7. In a dispenser, means for supporting a container of paper to be dispensed, comprising a top having an aperture through which said paper may be withdrawn, front, back and end walls depending from the four edges of said top and adapted to receive said container therebetween, means at the bottom of one of said walls for extending under one edge of said container and supporting said edge, and means on the opposite wall for holding said edge of said container on said supporting means and for supporting the opposite edge of said container.

8. In a dispenser, a holder for a container of paper to be dispensed, comprising a rectangular sheet metal top having an aperture through which said paper can be withdrawn, a front wall depending from and continuous with said top, end walls depending from and continuous with said top, a rear wall depending from and continuous with said top, a shelf at the bottom edge of one of said walls and continuous therewith, said shelf projecting toward the opposite wall and being adapted to extend under said container, and means on said opposite wall for holding said container on said shelf.

9. In a holder for a rectangular object, said holder having a top and a plurality of depending sides and a shelf extending along the bottom of one of said sides and projecting toward the opposite side, means for holding one edge of said rectangular object on said shelf comprising a leaf spring having the lower end thereof secured to said opposite side and having the upper end thereof spaced from said opposite side and toward said shelf.

10. In a dispenser, an open bottomed holder for a package of material to be dispensed comprising a top having a dispensing opening, walls depending from said top, and means projecting inwardly from a plurality of said walls to releasably hold the package below said top for supplying material to said dispensing opening.

11. In combination, a substantially flat supporting member, a rectangular box-like container below said member, means for pivotally supporting said container from said supporting member for rotation about a horizontal axis near the back of said container, means for releasably holding said container close to and substantially parallel to said supporting member, and cooperating stop means on said supporting member and said container for holding said container at a substantial oblique angle to the horizontal when released from said holding means, said pivotal supporting means comprising a pair of plate portions depending one at each end of said container pivotally carrying the container, and said stop means comprising cooperating pins and arcuate slots on the ends of said container and said plate member.

12. A device adapted for the dispensing of interfolded tissues from a package which comprises a support adapted for fixed suspension on the under side of a horizontal wall, a package holder pivoted to said support having a dispensing top movable between closed and dispensing position relative to the wall, and means for releasably retaining a package in said holder.

EUGENE LOUIS WILLIAMS.